Figure 2:
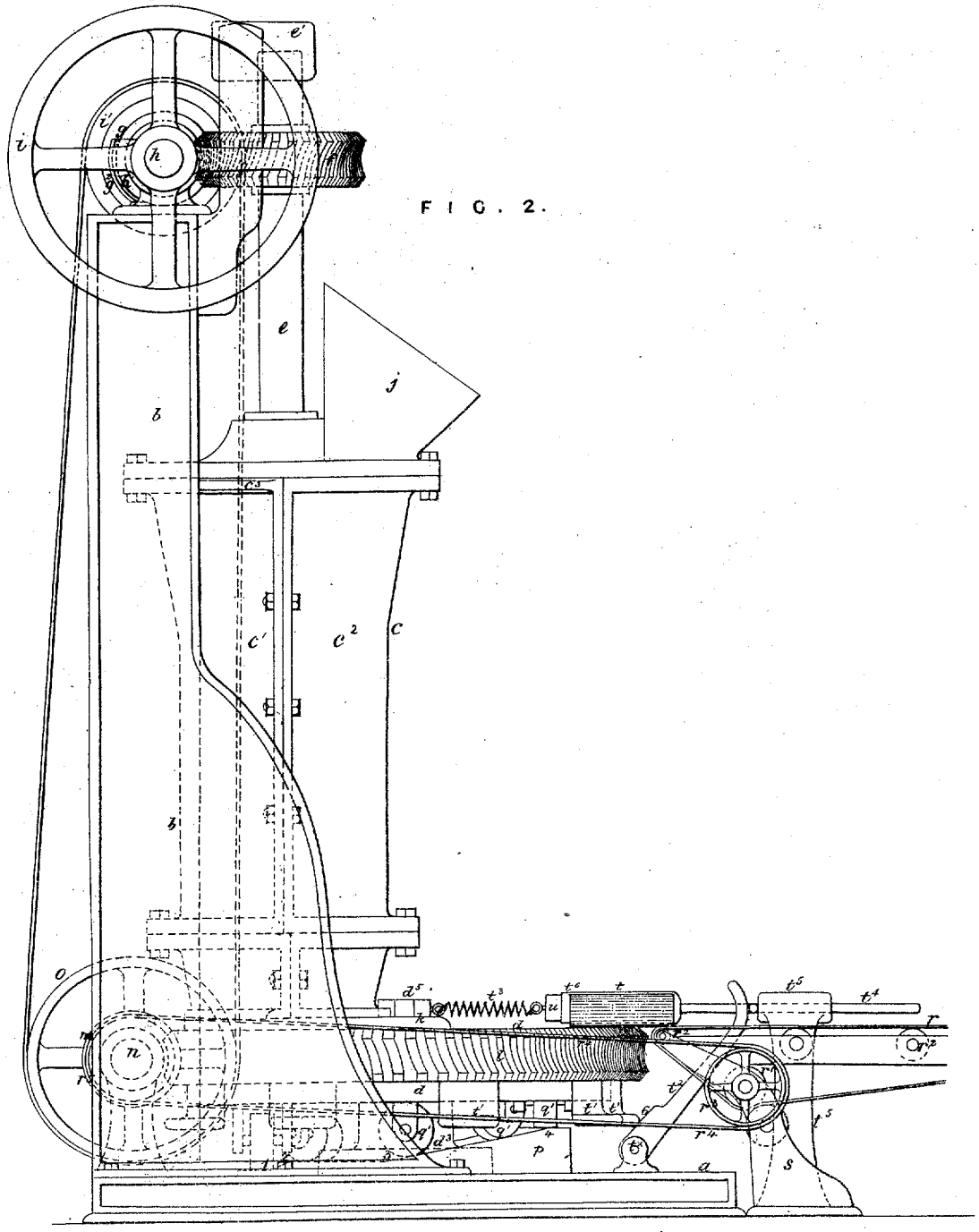

A. MORAND. 3 Sheets--Sheet 1.
Improvement in Brick-Machines.
No. 4,956. FIG. 1. Reissued June 25, 1872.
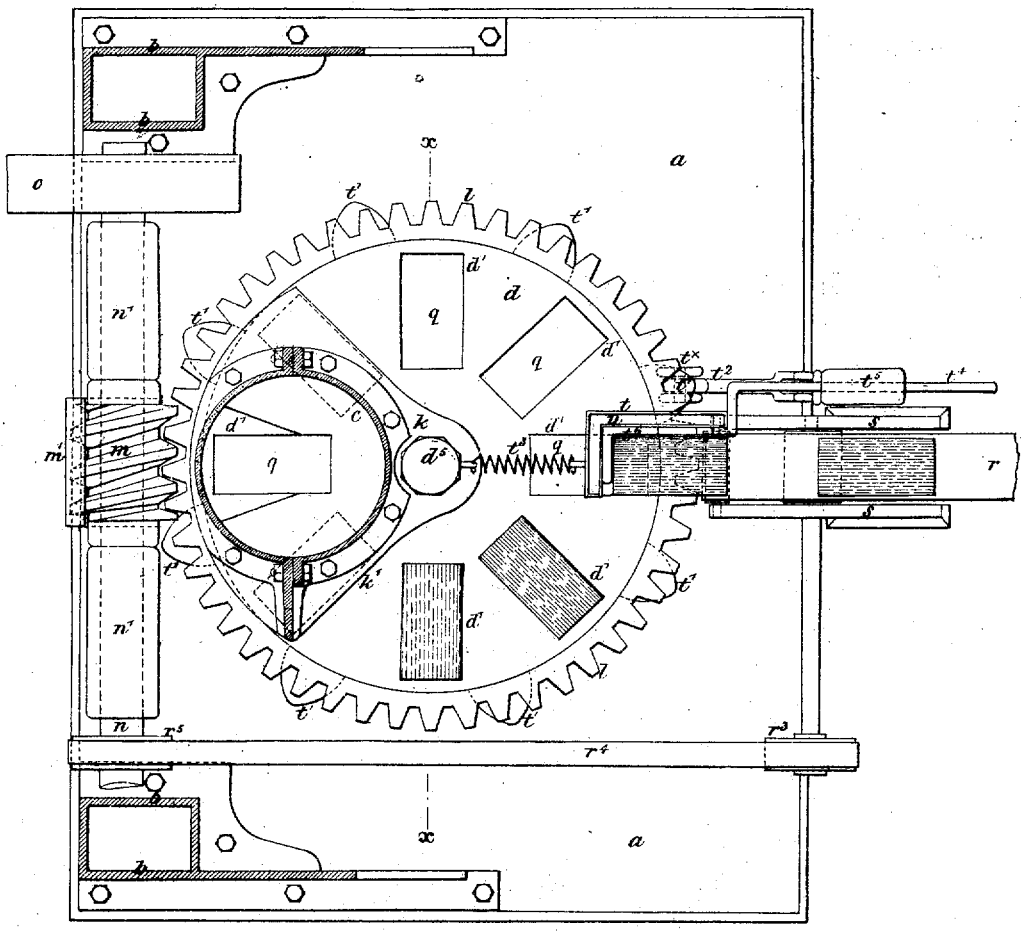
FIG. 4
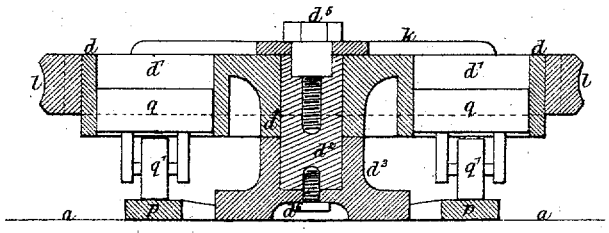
Witnesses:
E. A. Dick
H. H. Young
Augustus Morand
Inventor
By David A. Burr
Atty.
A.M. PHOTO-LITHOGRAPHIC CO. N.Y. (OSBORNE'S PROCESS.)

3 Sheets--Sheet 2.

A. MORAND.

Improvement in Brick-Machines.

No. 4,956. Reissued June 25, 1872.

Witnesses:
E. A. Dick
E. F. Young

Augustus Morand
Inventor
By David A. Burr Atty.

A.M. PHOTO-LITHOGRAPHIC CO. N.Y. (OSBORNE'S PROCESS.)

3 Sheets--Sheet 3.
A. MORAND.
Improvement in Brick-Machines.
No. 4,956. FIG. 3. Reissued June 25, 1872.
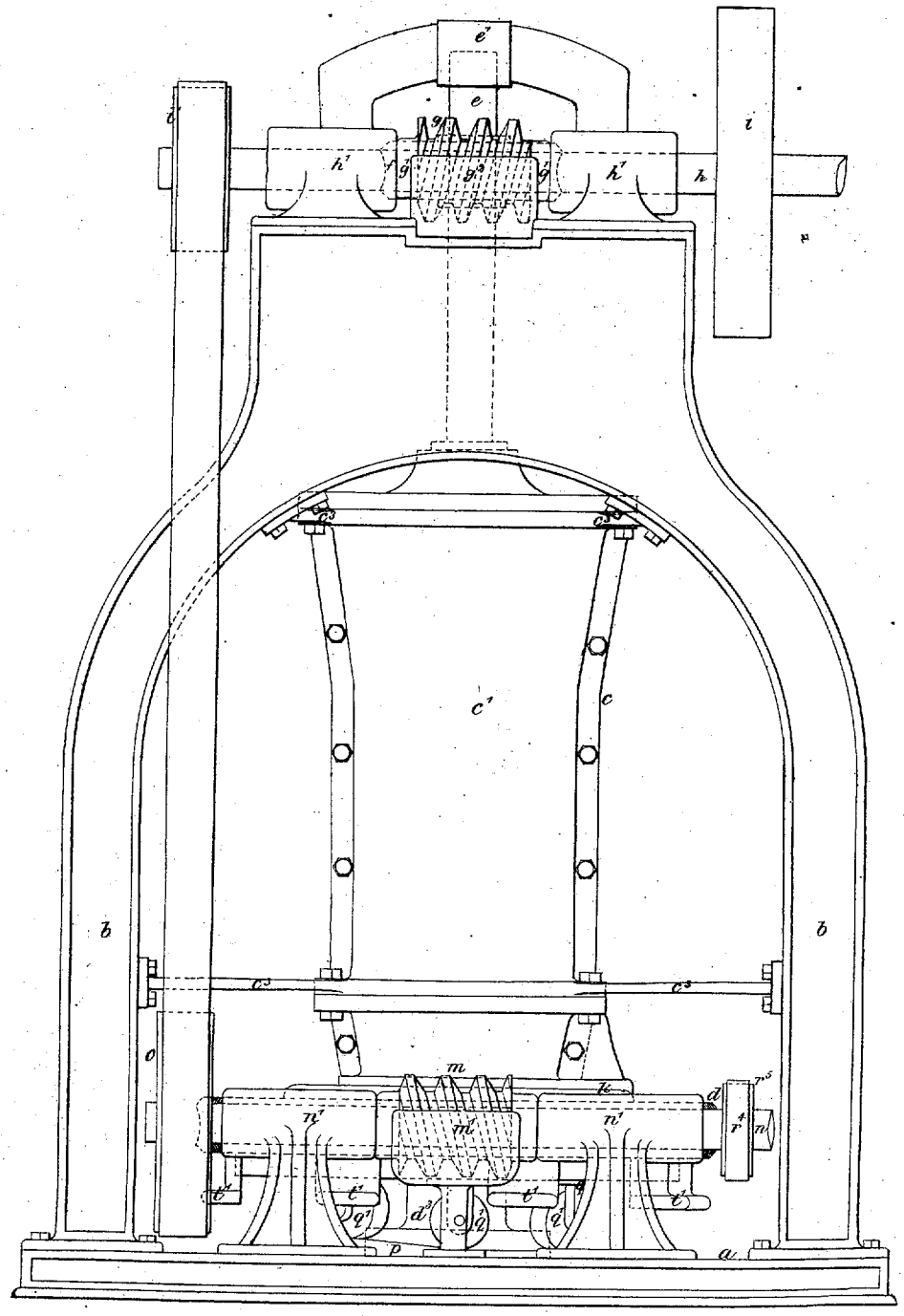
Witnesses:
E. A. Dyck
H. H. Young
Augustus Morand Inventor
By David A. Burr Atty.
AM. PHOTO-LITHOGRAPHIC CO. N.Y. (OSBORNE'S PROCESS.)

UNITED STATES PATENT OFFICE.

AUGUSTUS MORAND, OF BROOKLYN, NEW YORK.

IMPROVEMENT IN BRICK-MACHINES.

Specification forming part of Letters Patent No. 116,341, dated June 27, 1871; reissue No. 4,956, dated June 25, 1872.

SPECIFICATION.

Be it known that I, AUGUSTUS MORAND, of Brooklyn, New York, have invented certain Improvements in Machinery for Manufacturing Bricks, of which the following is a specification:

My said invention relates to a machine which has a pug-mill and a horizontally-rotating mold-wheel or table of the usual construction, the clay being passed through the said pug-mill to the molds in the table, and the bricks delivered therefrom in a manner well understood by those familiar with this manufacture. The object of my said invention is the production of a thoroughly-efficient machine, which will be more simple of construction, more durable, more compact and convenient, and less costly than the combined pugging and molding machines hitherto used. To effect this object, I construct my said machine in the following manner:

Upon a base-plate or bed of cast-iron or other suitable material I erect a strong upright frame or standard. Upon this standard the pug-mill is supported above the mold-wheel or table and at one side of the center of the same. The pug-mill shaft is driven directly from a horizontal driving-shaft by means of a worm or screw and worm-wheel, or by means of the ordinary forms of bevel-gearing. The said pug-mill shaft is supported at the top in a bearing formed in a bracket, which is securely fixed on the side and near the top of the main frame or standard. The mold-wheel or table is supported to turn freely on a stud or short fixed shaft, which is secured on the base-plate or bed. This table has a rotating motion independent of the pug-mill shaft, communicated to it by a worm or screw, which gears into worm-teeth on the mold-wheel on or near the periphery thereof. The said worm is fixed on a horizontal driving-shaft, which is supported to turn freely in standards fixed on the base-plate or some other suitable part of the machine. It will be observed that the required rotating motion may be communicated to the pug-mill shaft and the mold-wheel or table solely by worm-gearing, thereby simplifying the construction of the machine, and consequently diminishing its cost and its liability to derangement, and rendering it more compact and convenient, while at the same time the unpleasant noise occasioned by the use of cogged or toothed wheels will be obviated. Nevertheless it may be found advisable to substitute other forms of gearing for the pug-mill shaft.

The molds are formed in the table in the usual manner, and each mold is provided with a piston or follower for expelling the bricks from the mold. These followers are operated by an inclined circular plate placed below the table. I prefer to give the bricks a slight compression while they are in the molds, and I effect this compression by a peculiarly-formed position of the inclined plate below the pug-mill. At the bottom of the said pug-mill is a plate with an aperture, through which the clay is forced by the knives or blades of the pug-mill into the molds. The bottom of the pug-mill is so extended as to form a pressure-plate over the molds as they pass forward after being filled with clay. The inclined plate, acting on the followers as they pass under the aforesaid pressure-plate, gives the bricks the desired compression. It is important, however, that this pressure should be relaxed as the molds pass beyond the edge of the said plate, and I therefore make the portion of the inclined plate which lies under the edge of the said pressure-plate parallel with the same a short distance. The inclined circular plate, therefore, has the following peculiarity of configuration: It is first made level to allow the filled molds to pass from under the opening in the bottom of the pug-mill. It is then inclined upward to a point nearly under the edge of the bottom or pressure-plate, then made parallel with the said plate for a short distance, and from this parallel portion it is inclined upward to the point where the bricks are taken from the table. From this point, or beyond it, the inclination is reversed to allow the followers to descend.

I prefer to have the bricks delivered automatically from the table upon an endless carrying-belt or apron, which has one end arranged in close proximity to the table, so that it may receive the bricks directly therefrom. This belt or apron is passed over pulleys, one of which is connected by means of another pulley and belt with a driving-pulley on the lower horizontal or worm-shaft. As the table rotates the bricks in the molds are gradually ejected therefrom, and as fast as each brick is raised completely out of the mold it is brought up to a guide-bar or plate which lies parallel with the carrier-belt or apron. In connection with this guide-bar, or forming part of it, is a pusher, which drives the brick forward upon the apron, the latter then carrying it away from the table. I operate the said pusher by means of cam-like projections upon the table below the teeth thereon. The said pusher is forced outward by these projections, and is drawn inward after each brick is delivered by a suitably-arranged India-rubber or metal spring, or by a weight. The pusher has a chamber or box wherein I place some absorbent material or other contrivance for holding a quantity of lubricating matter, which may be conducted thereto from a reservoir through a tube or a groove or channel in the pusher-rod. As the pusher passes to and fro over the piston it lubricates the surface of the same. If it is desired to subject the bricks to a further compression after they have been removed from the molds, I may place a press near the periphery of the table. I, in this case, arrange the aforesaid pusher to deliver the bricks first to the press, and then from the press to the carrier-belt.

Figure 1 is a plan of my improved machine partly in horizontal section. Fig. 2 is a side elevation; and Fig. 3, a back elevation of the same. Fig. 4 is a section on the line *x x* of Fig. 1.

*a* is the base-plate or bed, which is of convenient shape and dimensions for supporting the various parts of the machine. *b* is the upright frame or standard; *c*, the pug-mill; *d*, the mold-wheel or table; *e*, the pug-mill shaft; *f*, a worm-wheel on the same. *g* is a worm or screw geared in connection with the worm-wheel *f*. *h* is a horizontal driving-shaft whereon the said worm *g* is firmly keyed or otherwise securely fixed. It will be observed that the worm *g* is fitted and kept in place between the two bearings $h^1$. $g^1$ $g^1$ are shoulders on the worm *g*. *i* is a pulley whereby the shaft *h* receives motion from the engine, and $i^1$ is another pulley on the said shaft for driving the lower horizontal shaft. The worm *g* should have a tray or trough, $g^2$, placed below it containing a proper lubricant, so that the said worm while working shall be partially immersed therein. The bearings $h^1$ are bolted or otherwise firmly secured on the top of the standard *b*. The upper end of the pug-mill shaft *c* has a bearing in the bracket $c^1$, which is also firmly bolted or screwed upon the standard *b*. The said shaft is provided inside the pug-mill with knives or blades in the usual manner. *j* is a hopper or chute for conducting the clay into the pug-mill. For convenience, I prefer to construct the cylinder of the pug-mill in two parts, $c^1$, $c^2$, the latter of which may be readily removed or opened when it is desired to examine the interior of the pug-mill. The arrangement of the pug-mill in relation to the table *d* will be readily understood by referring to Fig. 1, which shows clearly the molds $d^1$ in the said wheel. I prefer to use eight of these molds, but it is obvious that any other convenient number may be employed. $d^2$ is the center-pin or stud on which the table *d* rotates. The sectional view (Fig. 4) shows a convenient manner of securing the said pin. $d^3$ is a socket or foot, which is firmly bolted or otherwise fixed on the base-plate or bed *a*. The pin $d^2$ extends up level with the top of the table *d*. The lower face of the boss $d^4$ of the said table rests on the upper face of the socket $d^3$, so that the table has a firm support thereon. *l* is the worm-wheel or series of worm-teeth on the table. *m* is the worm or screw which is geared into the said worm-wheel. *n* is the lower horizontal shaft, on which the worm *m* is keyed or otherwise firmly secured. The worm *m*, like the upper worm *g*, is kept in place between two bearings, $n^1$, which are firmly bolted or screwed upon the base-plate *a*. *o* is a pulley on the end of the shaft *n*, whereby the said shaft is driven from the upper shaft *h*. $m^1$ is a vessel or trough for lubricating material, similar to $g^2$. It will be seen that the bottom plate *k* of the pug-mill is wider than the diameter of the cylinder, and that it extends to the center of the mold-wheel, where it has passed through it a screw, $d^5$, which is tapped into the pin or stud $d^2$. This screw and the screw $d^6$ hold the pin $d^2$ firmly in the socket. The pug-mill is firmly secured above the table upon the standard *b* by the arms $c^3$, which are firmly bolted or screwed to the said standard. The inclined circular plate *p* is also firmly secured upon the base-plate *a* below the table, as clearly shown in Fig. 2. The pistons or followers *q* have rollers, $q^1$, which run on the incline, and the bricks are raised out of the molds as the followers pass from under the pressure-plate *k* to the point of delivery on the incline. As hereinbefore specified, the peculiar formation of the incline allows me to compress the bricks in the molds and relax the pressure as the bricks pass from below the pressure-plate *k*. From 1 to 2 is a short incline which lies under the said pressure-plate, and it is obvious that in passing over this incline the followers will be forced upward and the bricks will be compressed between them and the plate *k*. If this pressure were continued beyond the edge $k^1$ of the said plate the bricks, in passing from under the said edge, would be unequally compressed. I therefore make the portion of the inclined plane from 2 to 3 horizontal or parallel with the plate *k*, and while passing over this part the followers are not acted upon. From the point 3 to 4 the followers are gradually raised and the bricks expelled from the molds. The devices for removing the bricks from the table are best shown in Figs. 1 and 2. *r* is the carrier-belt or apron, which passes over the pulleys $r^1$ $r^2$. On the shaft of the pulley $r^1$, which is supported in the brackets $s$, there is a pulley, $r^3$, which is connected by the belt $r^4$ with the pulley $r^5$ on the shaft $n$. $t$ is the combined pusher and mold-lubricator, which is moved outward by the cam-projections $t^1$, one of which is arranged on the table outside each of the molds. $t^2$ is a lever, whose fulcrum is at $t^*$. The projections $t^1$ act on the part 6 of this lever. $t^3$ is the spring for drawing back the pusher after each brick is delivered. $t^4$ is the pusher-guide, and $t^5$ the guide-brackets for the same. The incline $p$ is so arranged that the bricks are raised to the top of the table just before they come in contact with the guiding-part $t^6$ of the pusher-rod. The cam-projection $t^1$ then forces the pusher outward, which delivers the brick to the carrier-belt. The pusher then returns into position to receive the next brick. As it passes over the top of the piston or follower it deposits thereon the lubricating matter, which is carried down into the mold as the follower descends. $u$ is the chamber containing the lubricant, which may be supplied to the same continuously from a reservoir or in any other convenient manner. I sometimes form the bottom plate of the pug-mill with a receptacle for oil, which is admitted to the molds as they pass under it. In some cases I have two of the machines placed side by side and operated by a single engine mounted upon the base-plate or the standards, the same driving-shafts serving for both machines.

I claim as my invention—

1. The combination and the arrangement with each other, as herein specified, of the driving-shafts with their connections, the worm $m$, worm-wheel $l$, shaft $e$, mold-wheel $d$, molds $d^1$, followers $q\,q$, and inclined planes $p$, all substantially as and for the purpose set forth.

2. A sliding-pusher, $t$, for delivering the bricks from the mold-wheel or table $d$ to a suitable carrier-belt or to a press, forced outward by a lever, $t^2$, actuated by projections $t^1$ in the periphery of said mold-wheel and inwardly by a spring, $t^3$, all substantially in the manner and for the purpose herein set forth.

3. The pusher $t$ when provided with the lubricating reservoir $u$, substantially as and for the purpose specified.

AUGS. MORAND.

Witnesses:
DAVID A. BURR,
WM. H. VANDERBILT.